J. P. HUNDRUP & W. G. ALLEN.
DUST AND FUME ARRESTER.
APPLICATION FILED SEPT. 11, 1911.
1,061,292. Patented May 13, 1913.
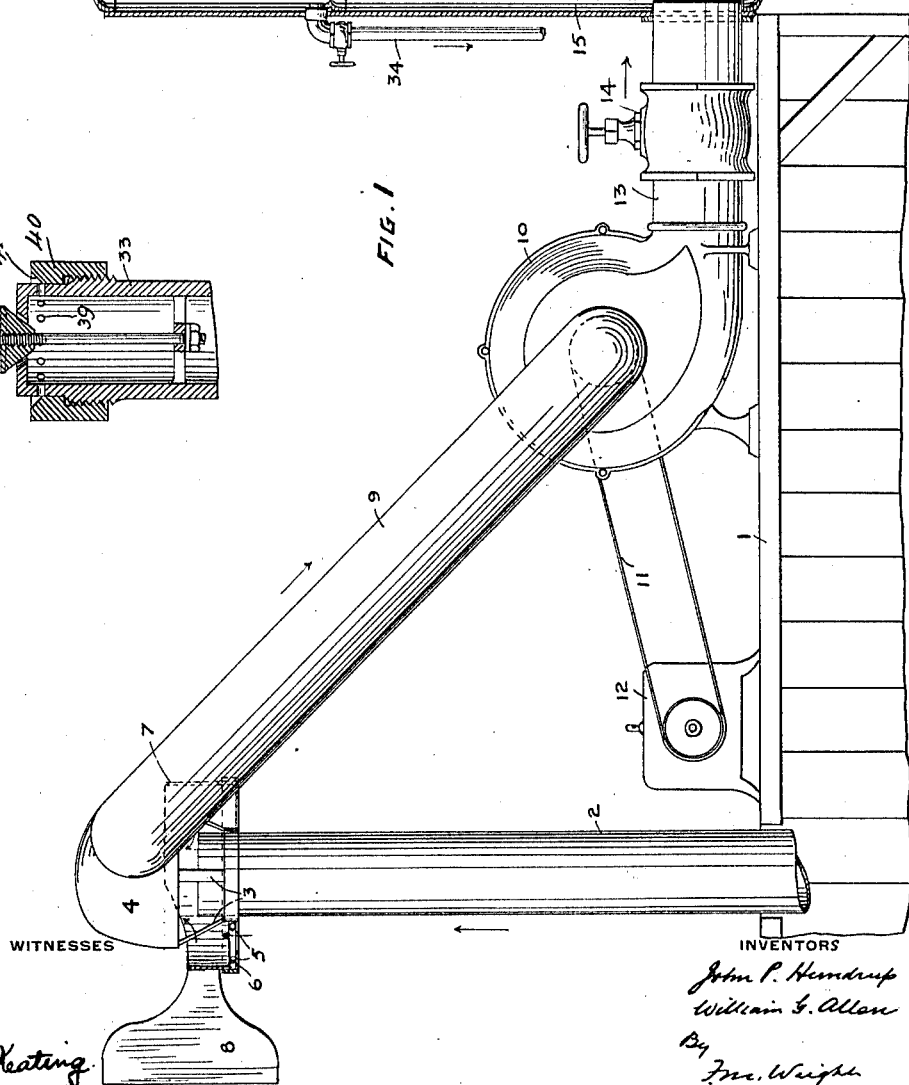

UNITED STATES PATENT OFFICE.

JOHN P. HUNDRUP, OF RIVERSIDE, AND WILLIAM G. ALLEN, OF SAN FRANCISCO, CALIFORNIA.

DUST AND FUME ARRESTER.

1,061,292.  Specification of Letters Patent.  Patented May 13, 1913.

Application filed September 11, 1911. Serial No. 648,720.

*To all whom it may concern:*

Be it known that we, JOHN P. HUNDRUP and WILLIAM G. ALLEN, citizens of the United States, residing, respectively, at Riverside, in the county of Riverside, and San Francisco, in the county of San Francisco, State of California, have invented new and useful Improvements in Dust and Fume Arresters, of which the following is a specification.

The object of the present invention is to provide an apparatus for preventing the escape of fine powder or dust such as is produced in cement mills or works, smelters, and the like, as well as the fumes arising therefrom, particularly from smelters and chemical works, and to recover the same, thus avoiding the injury to surrounding objects from the discharge of said dust or fumes and also effecting a saving in the products of said mills, smelters or works.

In the accompanying drawing, Figure 1 is a side view, partly in section, of our improved apparatus; Fig. 2 is an enlarged sectional view of a sprayer used therein.

Referring to the drawings, 1 indicates the top or roof of a building, such as a cement mill, to which our invention is shown as applied. From said top 1 rises a pipe or stack 2. Secured by arms 3 to the top of said pipe or stack is a hood 4, rounded at the top and spaced from the upper open end of said stack, and open at the bottom so as to admit air from the surrounding atmosphere into the passage between the stack and the hood. Supported by rollers 5 upon a circular runway 6 secured to said stack is a wind shield 7 from which extends a vane or rudder 8, which is actuated by the wind to turn the shield into a position preventing too strong a wind from entering between the stack and the hood. From the hood 4 a conduit 9 leads downwardly to the intake of a centrifugal blower 10 driven by a belt 11 from a motor 12, which blower draws air from the surrounding atmosphere and pulverulent or gaseous products from the mill and discharges them into a pipe 13 controlled by a valve 14, which pipe leads into the lower portion of a separator 15. Said separator consists of a suitable vertical casing 16, preferably cylindrical, and divided by a conical partition 17 into a lower, or dry, chamber 18, and an upper, or wet, chamber 19. Supported centrally of the conical partition 17 is a vertical stack 20 open at the top and bottom, the bottom of said stack being substantially at the level of the entrance into the separator of the pipe 13. A shield 21, suitably secured to the wall of the separator is interposed between the entrance of said pipe 13 and the lower end of said stack. By said shield the pulverized and gaseous products from the mill, mixed with the air, on being discharged into the separator are at once distributed throughout the dry chamber 18 thereof and upon entering said chamber they lose their velocity and the solid contents thereof tend to settle therein. Surrounding and secured to the vertical stack 20 is a helical baffle plate 22 having at its outer edge upwardly and downwardly extending flanges 23, 24. On this baffle plate the powder or dust falls, descends thereon by gravity, and drop therefrom into the inverted conical bottom 25 of said separator, whence it can be withdrawn at suitable intervals through a dumping valve 26. However a manhole is provided to admit an operator to clean the interior of said dry chamber, if necessary.

In the dry chamber there are deposited approximately from 90 to 95 per centum of the solid materials, dependent upon their character, and in many cases this may be a sufficient recovery to satisfy the requirements of economy and the avoidance of injury to surrounding objects. But in case the dry chamber alone is not sufficient to accomplish the above results, the materials discharging out of the stack 20 are received in the upper portion 19 of the separator, which we term the wet chamber. In this wet chamber, gases and dust emerging from the stack impinge against the under side of a conical deflector or apron 30 supported in any suitable manner from the walls of the separator, by which deflector the dust laden gases are deflected, so that they are compelled to pass under the edge of said deflector and between the upper surface thereof and a conical top 31 of said separator. While so passing they are subjected to the action of water in a fine spray which is supplied by a pipe 32 leading upwardly, preferably outside the seperator and then inwardly to the center thereof beneath the center of the deflector, and then upwardly having at the top a spraying nozzle 33, best shown in Fig. 2. Said nozzle is tubular and is formed with small apertures 39 through which the water escapes, it being guided by a deflector 40 having an inner conical surface 41. The nozzle is also formed with a terminal outwardly flaring opening, the size of which is regulated by a conical adjustable valve 42. By this arrangement the dust-laden gases are compelled to pass through finely divided water which effectually washes and cleanses the gases of the dust and soluble fumes therein. The water, carrying with it the solid matters recovered from the air and the gases in solution, drops on to the partition 17, and runs off therefrom by an outlet pipe 34 to any suitable point for either recovery or discharge as a waste product.

In the wet chamber, as well as in the dry chamber, there is provided a manhole 35 to enable the interior thereof to be inspected or cleaned when necessary.

The apparatus is intended for use with mills of all kinds in which dust, smoke, cinders, fumes and the like are produced, and in some of these the fumes are not soluble in cold water. It is our intention to recover such fumes by spraying boiling hot water and for this purpose there is provided a pipe 36 controlled by a valve 37, so that water of any desired temperature can be used for the spray. Water containing chemical substances in solution may also be introduced through the pipe 36.

We desire it to be understood that we do not limit ourselves to the precise details of construction shown herein. In particular the form of the spraying device may be greatly varied to suit the requirements of any particular case, also baffle plates of various forms may be used, as experience may suggest.

For the purpose of better illustration of the invention the separator is shown in a larger scale in proportion to that of the remaining parts of the apparatus than would be used in actual practice in most cases.

We claim:—

In an apparatus of the character described, the combination of a separator, baffling means therein, a blower, a pipe leading from said blower to said separator, a stack leading from the place of generation of dust and fumes, a hood surrounding the open top of the pipe, a movable wind shield for preventing a strong current of air entering said hood above said latter pipe, a tail adapted to be actuated by the wind to move said latter means into operative position.

In testimony whereof we have hereunto set our hands in the presence of two subscribing witnesses.

JOHN P. HUNDRUP.
WILLIAM G. ALLEN.

Witnesses to the signature of John P. Hundrup:
  MINNIE C. SHAFER,
  DANIEL J. MCKINNON.

Witnesses to the signature of William G. Allen:
  FRANCIS M. WRIGHT,
  N. B. KEATING.